US010298056B2

(12) United States Patent
Kudo et al.

(10) Patent No.: US 10,298,056 B2
(45) Date of Patent: May 21, 2019

(54) POWER CONTROL SYSTEM, POWER CONTROL METHOD, AND RECORDING MEDIUM

(71) Applicant: NEC Corporation, Tokyo (JP)

(72) Inventors: Koji Kudo, Tokyo (JP); Hitoshi Yano, Tokyo (JP); Ryo Hashimoto, Tokyo (JP); Hisato Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 268 days.

(21) Appl. No.: 15/033,612

(22) PCT Filed: Oct. 29, 2014

(86) PCT No.: PCT/JP2014/078766
§ 371 (c)(1),
(2) Date: Apr. 29, 2016

(87) PCT Pub. No.: WO2015/064641
PCT Pub. Date: May 7, 2015

(65) Prior Publication Data
US 2016/0294215 A1    Oct. 6, 2016

(30) Foreign Application Priority Data
Oct. 31, 2013  (JP) ................................. 2013-226251

(51) Int. Cl.
*H02J 13/00*   (2006.01)
*H02J 3/32*    (2006.01)
(Continued)

(52) U.S. Cl.
CPC ........ *H02J 13/0017* (2013.01); *G05B 13/026* (2013.01); *H02J 3/28* (2013.01);
(Continued)

(58) Field of Classification Search
CPC .. H02J 13/0017; H02J 7/0068; H02J 13/0006; H02J 3/28; H02J 3/32; H02J 2003/003; H02J 2003/146; G05B 13/026
See application file for complete search history.

(56) References Cited

U.S. PATENT DOCUMENTS

2003/0077494 A1* 4/2003 Aberle ................ B60L 11/1881
                                            429/430
2009/0105895 A1* 4/2009 Shige .................. B60L 11/1881
                                            701/22
(Continued)

FOREIGN PATENT DOCUMENTS

EP    2 509 180      10/2012
JP    2011-120323    6/2011
(Continued)

OTHER PUBLICATIONS

Machine Translation for JP2012165513.*
(Continued)

*Primary Examiner* — Khamdan N. Alrobaie
(74) *Attorney, Agent, or Firm* — Finnegan, Henderson, Farabow, Garrett & Dunner, L.L.P.

(57) ABSTRACT

A power control system includes an acquisition unit that acquires information indicating the amount of power demand that is used by a consumer according to predetermined information that prompts adjustment of the power demand, and a control unit that controls a predetermined apparatus in accordance with a target demand amount and the information indicating the power demand amount.

15 Claims, 10 Drawing Sheets

(51) Int. Cl.
*H02J 3/28* (2006.01)
*G05B 13/02* (2006.01)
*H02J 7/00* (2006.01)
*H02J 3/14* (2006.01)
*H02J 3/00* (2006.01)

(52) U.S. Cl.
CPC .............. *H02J 3/32* (2013.01); *H02J 7/0068* (2013.01); *H02J 13/0006* (2013.01); *H02J 2003/003* (2013.01); *H02J 2003/146* (2013.01)

(56) References Cited

U.S. PATENT DOCUMENTS

| | | | |
|---|---|---|---|
| 2012/0083927 | A1 | 4/2012 | Nakamura et al. |
| 2012/0239595 | A1 | 9/2012 | Kiuchi et al. |
| 2013/0009485 | A1* | 1/2013 | Sakuma ................... H02J 3/32 307/81 |
| 2013/0015713 | A1* | 1/2013 | Hagihara ................. H02J 3/32 307/72 |
| 2013/0134934 | A1* | 5/2013 | Yano ................... H01M 10/441 320/109 |
| 2013/0335033 | A1* | 12/2013 | Kuribayashi ....... B60L 11/1824 320/137 |
| 2014/0094981 | A1* | 4/2014 | Ito ....................... G05B 13/026 700/291 |
| 2014/0217989 | A1* | 8/2014 | Kudo ....................... H02J 3/32 320/134 |
| 2014/0272486 | A1* | 9/2014 | Kobayashi .......... H01M 10/399 429/52 |
| 2015/0256002 | A1* | 9/2015 | Yonetani .................. H02J 3/32 320/150 |
| 2016/0123644 | A1* | 5/2016 | Yoshimi ................. G05B 15/02 62/160 |
| 2016/0274607 | A1* | 9/2016 | Kudo ....................... H02J 3/32 |

FOREIGN PATENT DOCUMENTS

| | | |
|---|---|---|
| JP | 2012-165513 | 8/2012 |
| JP | 2013-106381 | 5/2013 |
| WO | WO 2012/066651 A1 | 5/2012 |
| WO | WO 2012/120623 A1 | 9/2012 |

OTHER PUBLICATIONS

International Search Report and Written Opinion dated Jan. 27, 2015, in corresponding PCT International Application.
Extended European Search Report from the European Patent Office dated Oct. 4, 2017, in counterpart European Patent Application No. 14859027.6.

* cited by examiner

FIG.3

| IDENTIFICATION INFORMATION OF LOAD 2a | OUTSIDE AIR TEMPERATURE | ROOM TEMPERATURE | POWER PRICE P | POWER CONSUMPTION |
|---|---|---|---|---|
| AIR CONDITIONER | To1 | Ti1 | A1 | ○○△ |
| | | | ⋮ | ⋮ |
| | | | Ay | ○○○ |
| | ⋮ | ⋮ | ⋮ | ⋮ |
| | Tox | Tix | A1 | ○□△ |
| | | | ⋮ | ⋮ |
| | | | Ay | □○○ |

FIG.4

| IDENTIFICATION INFORMATION OF LOAD 2a | OUTSIDE AIR TEMPERATURE | POWER PRICE P | TIME SLOT | POWER CONSUMPTION |
|---|---|---|---|---|
| AIR CONDITIONER | To1 | A1 | t0~t1 | ○△△ |
| | | | ⋮ | ⋮ |
| | | | tz-1~tz | □○○ |
| | | ⋮ | ⋮ | ⋮ |
| | | Ay | t0~t1 | ○□△ |
| | | | ⋮ | ⋮ |
| | | | tz-1~tz | □○□ |
| | ⋮ | ⋮ | ⋮ | ⋮ |
| | Tox | A1 | t0~t1 | ☆△△ |
| | | | ⋮ | ⋮ |
| | | | tz-1~tz | □☆○ |
| | | ⋮ | ⋮ | ⋮ |
| | | Ay | t0~t1 | ○□☆ |
| | | | ⋮ | ⋮ |
| | | | tz-1~tz | □○☆ |

FIG.6

| IDENTIFICATION INFORMATION OF LOAD 2a | POWER PRICE P | POWER CONSUMPTION |
|---|---|---|
| REFRIGERATOR | A1 | □○△ |
| | ⋮ | ⋮ |
| | Ay | ○□○ |

FIG.7

| IDENTIFICATION INFORMATION OF LOAD 2a | OUTSIDE AIR TEMPERATURE | POWER PRICE P | TIME SLOT | POWER CONSUMPTION |
|---|---|---|---|---|
| REFRIGERATOR | To1 | A1 | t0~t1 | ○☆△ |
| | | | ⋮ | ⋮ |
| | | | tz-1~tz | ☆○○ |
| | | ⋮ | ⋮ | ⋮ |
| | | Ay | t0~t1 | ○□☆ |
| | | | ⋮ | ⋮ |
| | | | tz-1~tz | □☆□ |
| | ⋮ | ⋮ | ⋮ | ⋮ |
| | Tox | A1 | t0~t1 | ☆△☆ |
| | | | ⋮ | ⋮ |
| | | | tz-1~tz | ☆☆○ |
| | | ⋮ | ⋮ | ⋮ |
| | | Ay | t0~t1 | ○☆☆ |
| | | | ⋮ | ⋮ |
| | | | tz-1~tz | □○△ |

POWER CONTROL SYSTEM, POWER CONTROL METHOD, AND RECORDING MEDIUM

CROSS-REFERENCE TO RELATED PATENT APPLICATIONS

This application is a National Stage Entry of International Application No. PCT/JP2014/078766, filed Oct. 29, 2014, which claims priority from Japanese Patent Application No. 2013-226251, filed Oct. 31, 2013. The entire contents of the above-referenced applications are expressly incorporated herein by reference.

TECHNICAL FIELD

The present invention relates to a power control system, a power control method, and a program, and more particularly relates to a power control system, a power control method, and a program for controlling power demand.

BACKGROUND ART

Renewable power sources that use renewable energy such as solar power and wind power to generate power are receiving attention, and the incorporation of renewable power sources into a power and is being promoted.

The output of a renewable power source depends on weather factors such as sunlight and the amount of wind. As a result, the output of a renewable power source is unstable, and as a consequence, when most renewable power sources are incorporated in a power grid, it is thought that the amount of power that can be supplied will become unstable, and the balance between supply and demand deteriorates.

As a method of adjusting the balance between power supply and demand in a power grid, a method is principally used in which power companies (the power generating side) adjust the output of thermal generators of a thermal generation power plant.

However, the method of adjusting the output of thermal generators to compensate the balance between power supply and demand that arises from the fluctuation in the output of renewable power sources is considered problematic and inadequate when the output of most renewable power sources fluctuates due to the effect of weather. As a result, a new scheme of adjusting the balance between power supply and demand that includes power consumers the consuming side) is now believed to be necessary.

As an example of this scheme, Patent Document 1 discloses a power management device that manages the balance between supply and demand of electric power by issuing to power consumers people) demands that prompt adjustment of the amount of power demand. This power management device adjusts the amount of power demand by causing power consumers to control electrical equipment according to demand.

As disclosed in Patent Document 1, a method of using demand to cause power consumers to adjust the amount of electric power demand is generally called demand-response. Demand response is hereinbelow referred to as "DR." The FERC (Federal Energy Regulation Commission) defines DR as "Changes in electric usage by demand-side resources (from their normal consumption patterns) in response to changes in the price of electricity over time, or to incentive payments designed to induce lower electricity use at times of high wholesale market prices or when system reliability is jeopardized."

RELATED ART DOCUMENTS

Patent Documents

Patent Document 1: JP2013-106381A

SUMMARY

Problems to be Solved by the Invention

In the method of managing the amount of power demand described in Patent Document it is not known whether a power consumer will actually control electrical equipment according to demand. As a result, in the method of managing the amount of electric power demand that is described in Patent Document 1, there is a problem regarding the low accuracy of managing the amount of power demand that causes the actual amount of power demand to approach a target amount of power demand.

It is an object of the present invention to provide a power control system, a power control method, and a program that can solve the above-described problem.

Means for Solving the Problem

The power control system of the present invention includes: acquisition means that acquires information indicating the amount of power demand of consumers that accords with predetermined information that prompts adjustment of power demand; and control means that controls predetermined apparatuses according to information indicating the amount of power demand and a target demand amount.

The power control system of the present invention includes: acquisition means that acquires the amount of power demand that is used by consumers after predetermined information prompting adjustment of power demand has been transmitted from the transmission origin of the predetermined information; and control means that uses predetermined apparatuses to compensate the difference between the total amount of the power demand and the target demand amount.

The power control method of the present invention includes steps of: acquiring information indicating the amount of power demand that is used by consumers that accords with predetermined information that prompts adjustment of power demand, and controlling predetermined apparatuses according to information indicating the amount of power demand and the target power amount.

The recording medium of the present invention is a recording medium that can be read by a computer and on which a program is recorded for causing a computer to execute: an acquisition procedure of acquiring information indicating the amount of power demand of consumers that accords with predetermined information prompting the adjustment of power demand and a control procedure of controlling predetermined apparatuses according to information indicating the power demand amount and a target demand amount.

Effect of the Invention

The present invention enables high-accuracy execution of adjustment of the power demand amount that causes the actual power demand amount to approach a target power demand amount.

BRIEF DESCRIPTION OF THE DRAWINGS

FIG. 3 shows an example of the load-related information of an air conditioner.

FIG. 4 shows an example of the operation history of an air conditioner.

FIG. 6 shows an example of the load-related information of a refrigerator.

FIG. 7 shows an example of the operation history of a refrigerator.

EXEMPLARY EMBODIMENT

An exemplary embodiment of the present invention is next described with reference to the accompanying drawings.

Figure 1:
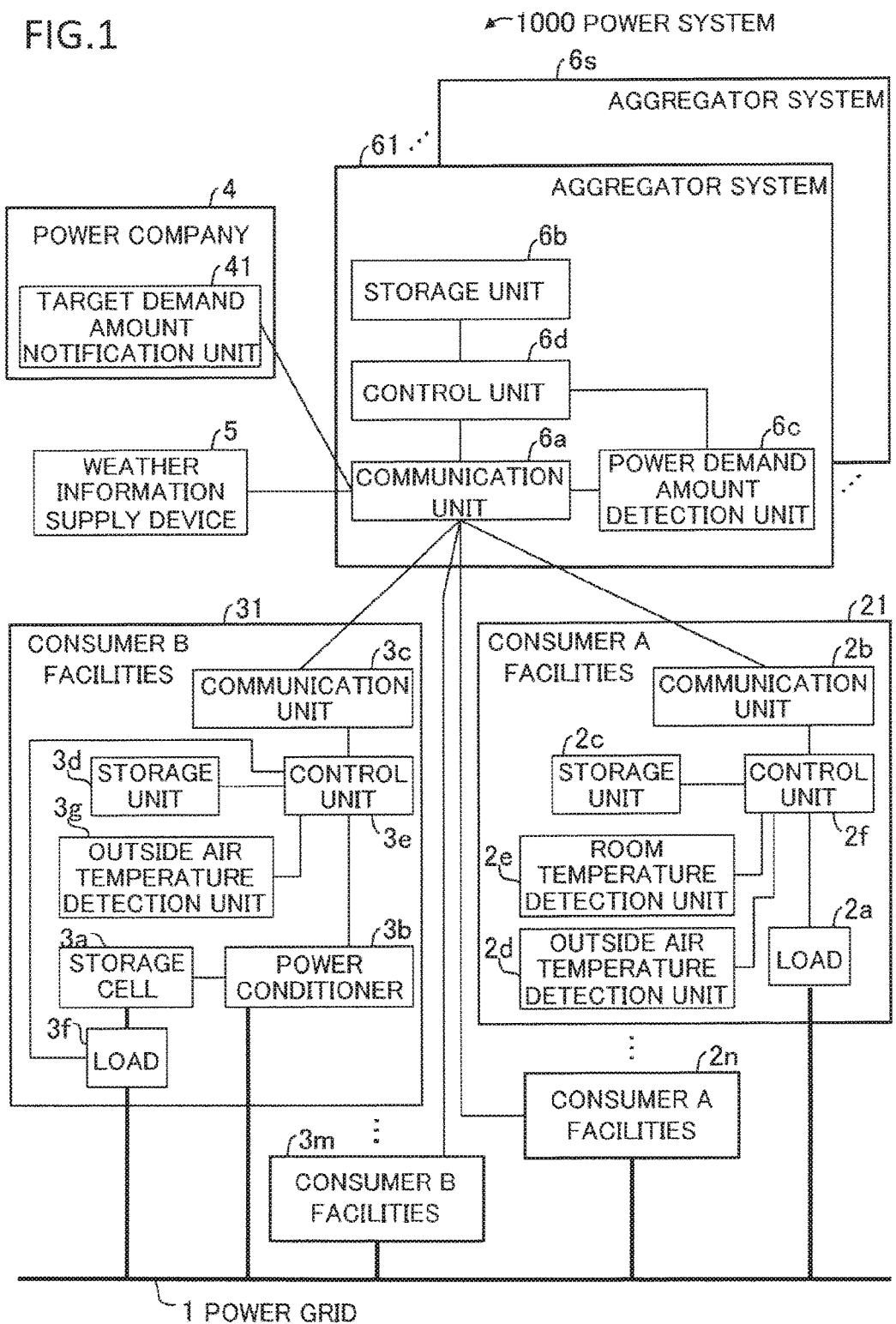
FIG. 1 shows power system 1000 that adopts the power control of an exemplary embodiment of the present invention.

FIG. 1 shows power system 1000 that adopts a power control system of an exemplary embodiment of the present invention.

Power system 1000 includes: power grid 1, consumer A facilities 21-2n (where n is an integer equal to or greater than 1), consumer B facilities 31-3m (where m is an integer equal to or greater than 1), target demand amount notification unit 41, weather information supply device 5, and aggregator systems 61-6s (where s is an integer greater than or equal to 1).

In the present exemplary embodiment, "consumers" refers to consumers or electric power consumers.

In FIG. 1, consumer A facilities and consumer B facilities that communicate with aggregator systems that differ from aggregator system 61 (for example, aggregator system 6s) are omitted.

Aggregator systems 61-6s are of identical configuration. As a result, to simplify the explanation, the following explanation will focus on points relating to aggregator system 61 of aggregator systems 61-6s.

Power grid 1 is a system that supplies electric power to consumer A facilities 21-2n and consumer B facilities 31-3m. Power grid 1 includes power generators not shown in the figures (for example, thermal power generators and renewable power sources).

In consumer A facilities 21-2n, electric power demand is regulated according to power price information transmitted from aggregator system 61. The power price information shows the power price. Consumer A is an example of a second consumer.

Each of consumer A facilities 21-2n includes load 2a, communication unit 2b, storage unit 2c, outside air temperature detection unit 2d, room temperature detection unit 2e, and control unit 2f. Load 2a is one example or a specific apparatus. Control unit 2f is one example of the apparatus control means.

Load 2a is, for example, an air conditioner, a washing machine, or a refrigerator. Load 2a is not limited to an air conditioner, washing machine, or refrigerator and can be altered as appropriate. Load 2a is an apparatus of consumer A. Loads 2a may each be the same type of apparatus, or may be apparatuses of mutually differing types.

Communication unit 2b communicates with aggregator system 61.

Storage unit 2c stores information relating to load 2a.

Outside air temperature detection unit 2d detects the outside air temperature.

Room temperature detection unit 2e detects the indoor temperature (room temperature) in which load 2a is arranged.

Control unit 2f is, for example, an HEMS (Home Energy Management System) terminal.

Control unit 2f controls the operation of load 2a. For example, when communication unit 2b has received power price information from aggregator system 61, control unit 2f controls the operation of load 2a according to the power price information. In addition, control unit 2f further measures the power consumption of load 2a. A communication protocol such as ECHONET Lite is used in order to carry out this control and measurement between control unit 2f and load 2a.

In Consumer B facilities 31-3m, power demand is regulated in accordance with operation instructions transmitted from aggregator system 61. Consumer B is an example of the first consumer.

Each of consumer B facilities 31-3m includes storage cell 3a, power conditioner 3b, communication unit 3c, storage unit 3d, control unit 3e, load 3f, and outside air temperature detection unit 3g.

Storage cell 3a is one example of a predetermined apparatus that affects the amount of power demand on the consumer side. The predetermined apparatus is not limited to a storage cell and can be altered as appropriate. For example, a heat pump water heater, a fuel cell, or a load may be used as the predetermined apparatus. As the predetermined apparatus, an apparatus is preferably used that imposes no inconvenience upon the user even if operation is controlled without relation to the user's intention. Predetermined apparatuses may be of the same type, or may be mutually differing apparatuses. Storage cell 3a is the apparatus of consumer B.

Power conditioner 3b has the functions of converting the direct-current power from storage cell 3a to alternating-current power and supplying this alternating-current power to power grid 1. In addition, power conditioner 3b has the functions of converting the alternating-current power from power grid 1 to direct-current power and supplying this direct-current power to storage cell 3a. However, the supply of alternating-current power from storage cell 3a to power grid 1 (reverse power flow) is, in some cases, recognized and in other cases not recognized as a system. As a result, the possibility of reverse power flow is determined according to conditions. When reverse power flow is not recognized, the upper limit of the discharge power of storage cell 3a is the value of the electric power that is consumed by consumer B facility.

Communication unit 3c communicates with aggregator system 61.

Storage unit 3d stores information relating to power conditioner 3b. For example, storage unit 3d stores the rated output of power conditioner 3b.

Control unit 3e is, for example, an HEMS terminal.

Control unit 3e controls power conditioner 3b to control the operation of storage cell 3a For example, when communication unit 3c receives an operation instruction from aggregator system 61, control unit 3e controls power conditioner 3b according to the operation instruction to control the operation (charging and discharging) of storage cell 3a. In addition, control unit 3e measures the amount of electric power that is charged to storage cell 3a. Further, control unit 3e uses communication unit 3c to transmit to aggregator system 61 the rated output of power conditioner 3b that is stored in storage unit 3d. Control unit 3e uses communication unit 3c to transmit the charging/discharging power of storage cell 3a to aggregator system 61.

Load 3f is one example of a specific apparatus. For example, load 3f is an air conditioner, a washing machine, or refrigerator. However, load 3f is not limited to an air conditioner, a washing machine, or refrigerator and can be altered as appropriate. Load 3f is an apparatus of consumer B. Loads 3f may each be the same type or may be apparatuses of mutually differing types. Control unit 3e measures the power consumption of load 3f. A communication protocol such as ECHONET Lite is used so that control unit 3e can measure the power consumption of load 3f.

Outside air temperature detection unit 3g determines the outside air temperature.

Target demand amount notification unit 41 reports to aggregator systems 61-6s target total demand amount information that shows the target demand amount demanded by power company 4. In the present exemplary embodiment, target demand amount notification unit 41 reports target total demand amount information that shows the target total demand amount of each time in a period of time in which power demand adjustment is necessary (hereinbelow referred to as the "adjustment time slots) (hereinbelow referred to as the target total demand amount of an adjustment time slot) to aggregator systems 61-6s. The adjustment time slots are an example of predetermined time slots.

An example of the relation between power company 4 and aggregator systems 61-6s is next described.

Aggregator systems 61-6s each calculate, of the target total demand amount that was notified from power company 4, the target demand amount that its own system can realize in the adjustment time slot. Aggregator systems 61-6s then provide the calculation results (target demand amounts) to target demand amount notification unit 41.

In power company 4, target demand amount notification unit 41 identifies the target demand amount (for example, a plurality of target demand amounts) that is necessary for achieving the target total demand amount from among the calculation results from aggregator systems 61-6s. Target demand amount notification unit 41 then requests the aggregator systems that presented the target demand amounts that were identified to adjust the power demand.

As an example of the method of securing the target demand amounts that are necessary for achieving the target total demand amount, there is a method of having bids tendered for the target demand amounts until the total amount of the target demand that was identified reaches the target total demand amount. In this case, the aggregators tender bids while considering the target demand amount that the aggregators themselves are capable of realizing.

Target demand amount notification unit 41 may report to aggregator systems 61-6s target demand amount information that shows the target demand amount of each aggregator. In the following explanation, it will be assumed that target demand amount notification unit 41 reports to aggregator systems 61-6s target demand amount information that shows the target demand amount of each aggregator.

Weather information supply device 5 provides to aggregator systems 61-6s weather information such as "clear" or "cloudy" as well as outside weather information such as the temperature or humidity.

Aggregator system 61 is one example of the power control system.

Aggregator system 61 receives target total demand amount information that shows the target total demand amount of each time in an adjustment time slot from target demand amount notification unit 41.

Aggregator system 61 calculates the target demand amount of each time in the adjustment time slot according to the target total demand amount of each time in the adjustment time slot. Upon receiving a request (consent to a contract) for adjustment from power company 4 regarding the calculation result (the target demand amount of each time in the adjustment time slot), aggregator system 61 carries out adjustment of power demand at each time in the adjustment time slot.

For example, aggregator system 61 controls the operation of load 2a and storage cell 3a such that the total amount of the power demand in consumer A facilities 21-2n and consumer B facilities 31-3m becomes the target demand amount at each time that is an object of adjustment within an adjustment time slot. The adjustment-object time is an example of the predetermined time.

In the present exemplary embodiment, the adjustment-object times are set at one-minute units. The interval of the adjustment-object times is not limited to one minute and can be altered as appropriate. The intervals of the adjustment-object time need not be equal. In the present exemplary embodiment, the starting time of an adjustment time slot is used as the first adjustment-object time.

Aggregator system 61 controls the amount of power demand of each load 2a by transmitting power price information to consumer A facilities 21-2n. In addition, aggregator system 61 controls the amount of power demand or the amount of power supply of each storage cell 3a by transmitting operation instructions to consumer B facilities 31-3m.

Aggregator system 61 includes communication unit 6a, storage unit 6b, power demand amount detection unit 6c, and control unit 6d.

Communication unit 6a communicates with consumer A facilities 21-2n, consumer B facilities 31-3m, target demand amount notification unit 41, and weather information supply device 5.

Storage unit 6b stores information relating to loads 2a, storage cells 3a, and power conditioners 3b. For example, storage unit 6b stores the rated outputs of power conditioners 3b that were transmitted from consumer B facilities 31-3m.

Power demand amount detection unit 6c is one example of the acquisition means.

Power demand amount detection unit 6c acquires information that indicates the total amount of the power demand (hereinbelow referred to as simply the "total amount of the power demand") of consumer A facilities 21-2n and consumer B facilities 31-3m in the state in which power price information has been transmitted from communication unit 6a. In the present exemplary embodiment, power demand amount detection unit 6c detects the total amount of the power demand at each adjustment-object time.

Control unit 6d is an example of the control means.

Control unit 6d controls the operations of aggregator system 61, loads 2a, and storage cells 3a.

For example, control unit 6d controls the operation of storage cells 3a to compensate for the difference between the detection result of the total amount of the power demand and the target demand amount at each adjustment-object time.

In addition, at a time point preceding an adjustment time slot, control unit 6d uses the target demand amount of the adjustment time slot to determine the power price information that indicates the power price of each time within the adjustment time slot and the estimated value of the total amount of the power demand for each adjustment-object time under the condition that the power price information has been transmitted. In the present exemplary embodiment, control unit 6d determines the power price information such that the estimated value of the total amount of the power demand for each adjustment-object time approaches the target demand amount.

Further, control unit 6d uses communication unit 6a to transmit power price information to consumer A facilities 21-2n at a time point preceding the adjustment time slot. As a result, control unit 6d functions as the transmission origin of the power price information.

In addition, control unit 6d adjusts the charging amounts of storage cells 3a according to the difference between the estimated value of the total amount of power demand and the target demand amount at a point in time before the adjustment time slot. As a result, storage cells 3a that can be used for compensating for the difference between the total amount of the power demand and the target demand amount become available.

The operation is next described.

In the interest of simplifying the explanation, the operation is described assuming the following case. However, the present exemplary embodiment is not limited to the following case.

Each consumer A concludes a 30-A contract with power company 4 in which the maximum used amperage at a consumer A facility is 30 A (maximum used power is 3 kW). The number (n) of consumer A facilities is 2,000,000.

Each consumer A has concluded a contract (indirect DR contract) with the aggregator that manages aggregator system 61 according to which power price information is received from aggregator system 61 regarding the operation of load 2a. Control unit 2f of each consumer A controls the apparatus (load 2a) of the consumer A facility according to the power price information that was received.

Each consumer B has concluded a 60-A contract with power company 4 in which the maximum used amperage at a consumer B facility is 60 A (the maximum used power being 6 kW). The number (m) of consumer B facilities is 1,000,000.

Assuming an incentive, each consumer B has concluded a contract (direct DR contract) with the aggregator that manages aggregator system 61 in which the operation of storage cell 3a allows being controlled according to operation instructions from aggregator system 61. As examples of the incentive, compensation, a reduction of the power price, or the granting of points is used.

At a predetermined time each day, aggregator system 61 transmits to consumer A facilities 21-2n power price information that shows the power price at each time of the following day.

Control unit 21 in each of consumer A facilities 21-2n has "automatic" and "manual" as modes for controlling load 3a.

The operation of control unit 2f is here described.

The operation of control unit 2f when communication unit 2b receives power price information is first described.

Upon receiving power price information from aggregator system 61, communication unit 2b supplies this power price information to control unit 2f.

Upon receiving the power price information, control unit 2f stores the power price information in storage unit 2c. If power price information has already been stored in storage unit 2c at the time that control unit 2f receives the power price information, control unit 2f updates the power price information that is stored in storage unit 2c to the new power price information that was received from communication unit 2b.

The operation of control unit 2f relating to the control of load 2a is next described.

Control unit 2f stores an apparatus control algorithm (program) for controlling the operation of load 2a. Control unit 2f controls the operation of load 2a in accordance with the apparatus control algorithm.

Figure 2:
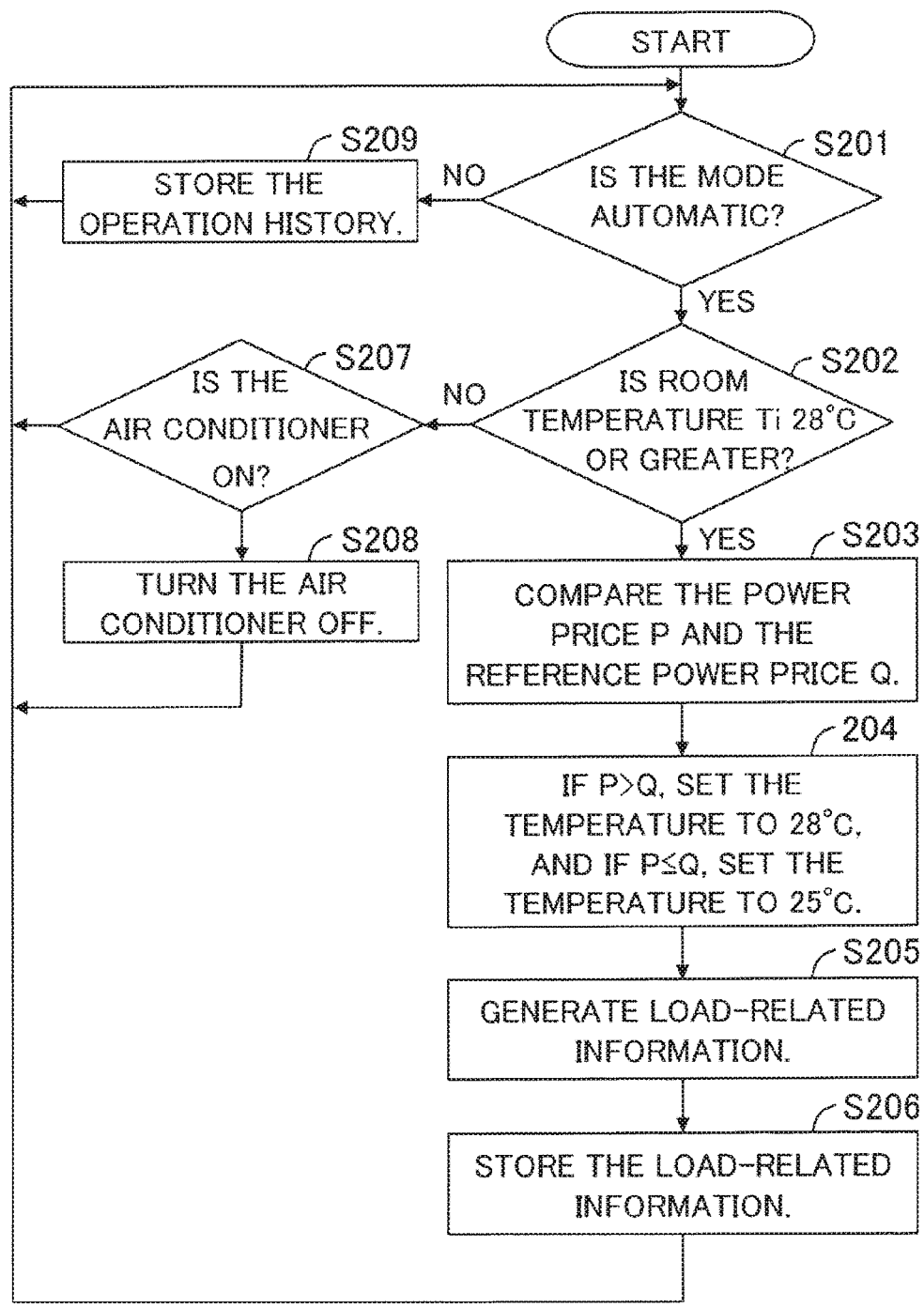
FIG. 2 is a flow chart for describing an example of the apparatus control algorithm for an air conditioner.

FIG. 2 is a flow chart to describe an example of the apparatus control algorithm (an apparatus control algorithm for an air conditioner) when load 2a is an air conditioner.

Control unit 2f determines whether the mode of control unit 2f is set to "automatic" (Step S201).

If the mode is set to "automatic" in Step S201, control unit 2f determines whether room temperature Ti that was detected by room temperature detection unit 2e is equal to or higher than 28° C. (Step S202).

When room temperature Ti is equal to or higher than 28° C. in Step S202, control unit 2f compares the power price P at the time that is indicated by the power price information with the reference power price Q (Step S203). The reference power price Q is, for example, stored in advance in storage unit 2c.

If power price P is higher than reference power price Q, control unit 2f next sets the set temperature of air conditioner 2a to 28° C. On the other hand, if power price P is equal to or less than the reference power price Q, control unit 2f sets the set temperature of air conditioner 2a to 25° C. (Step S204). As a result, the operation of air conditioner 2a is controlled based on power price P.

Control unit 2f next generates load-related information that indicates the relation between the identification information (air conditioner) of load 2a, the outside air temperature To detected by outside air temperature detection unit 2d, the room temperature Ti detected by room temperature detection unit 2e, power price P, and the power consumption of load 2a (Step S205).

When the load-related information has been generated, control unit 2f stores this load-related information in storage unit 2c(Step S206).

FIG. 3 shows an example of the load-related information of an air conditioner in storage unit 2c.

In FIG. 3, the identification information of load 2a, outside air temperature To, room temperature Ti, power price P, and the power consumption have been placed in association with the load-related information of the air conditioner.

The load-related information shown in FIG. 3 shows changes in the power consumption of the air conditioner in a state in which the mode of control unit 2f is set to "automatic." The load-related information of an air conditioner and the apparatus control algorithm for an air conditioner are used when aggregator system 61 estimates the power consumption of the air conditioner under conditions in which the mode of control unit 2f is set to "automatic." The load-related information of the air conditioner and the apparatus control algorithm for an air conditioner are examples of specific information.

When control unit 2f has generated load-related information, and when, as a result of comparison of this load-related information, load-related information is present in storage unit 2c in which the identification information, the outside air temperature To, and the power price P are identical but the power consumption is different (hereinbelow referred to as "first load-related information"), control unit 2f operates as described below.

Control unit 2f first uses the power consumption in the first load-related information and the power consumption in the load-related information that was generated in Step S205 to calculate a representative value of power consumption. For example, control unit 2f calculates the average value of power consumption in the first load-related information and power consumption in the load-related information that was generated in Step S205 as the representative value of power consumption. As a modification, control unit 2f may add weighting that is greater than power consumption in the first load-related information to power consumption in the load-related information that was generated in Step S205 and then calculate the average value (weighted average value) of each weighted power consumption as the representative value of power consumption. Control unit 2f then updates power consumption in the first load-related information to the representative value of power consumption.

Alternatively, when control unit 2f has generated load-related information, and when, as a result of comparing this load-related information, there is load-related information (hereinbelow referred to as the "second load-related information") in storage unit 2c in which the identification information, outside air temperature To, and the power price P are identical but the room temperature Ti is different, control unit 2f operates as described below.

Control unit 2f first uses the room temperature Ti in the second load-related information and the room temperature Ti in the load-related information that was generated in Step S205 to calculate a representative value of room temperature Ti. For example, control unit 2f calculates the average value of room temperature Ti in the second load-related information and room temperature Ti in the load-related information that was generated in Step S205 as the representative value of room temperature Ti. As a modification, control unit 2f may add a weighting that is greater than room temperature Ti in the second load-related information to room temperature Ti in the load-related information that was generated in Step S205 and then calculate the average value (weighted average value) of each weighted room temperature Ti as the representative value of room temperature Ti. Control unit 2f then updates room temperature Ti in the second load-related information to the representative value of room temperature Ti.

When Step S206 is completed, control unit 2f returns the process to Step S201.

When room temperature Ti is lower than 28° C. in Step S202, control unit 2f determines whether air conditioner 2a is in the ON state (Step S207).

If air conditioner 2a is in the ON state in Step S207, control unit 2f places air conditioner 2a in the OFF state (Step S208). When Step S208 has been completed, control unit 2f returns the process to Step S201.

On the other hand, if air conditioner 2a is in the OFF state in Step S207, control unit 2f returns the process to Step S201.

Further, when the mode is set to "manual" in Step S201, control unit 2f stores the operation history of the air conditioner in storage unit 2c (Step S209).

The identification information of load 2a, outside air temperature To, power price P, time slots, power consumption, and year and date are used as items of the operation history of an air conditioner.

FIG. 4 shows an example of the operation history of an air conditioner. In FIG. 4, the item of the year and date has been omitted in the interest of simplifying the explanation.

The operation history of the air conditioner shown in FIG. 4 shows the thane in power consumption of the air conditioner under the condition of the mode of control unit 2f being set to "manual." The operation history of the air conditioner is used when aggregator system 61 estimates the power consumption of the air conditioner under the condition in which the mode of control unit 2f is set to "manual." The operation history of the air conditioner is one example of the specific information.

An example of the apparatus control algorithm (apparatus control algorithm for a refrigerator) is next described for a case in which load 2a is a refrigerator.

Figure 5:
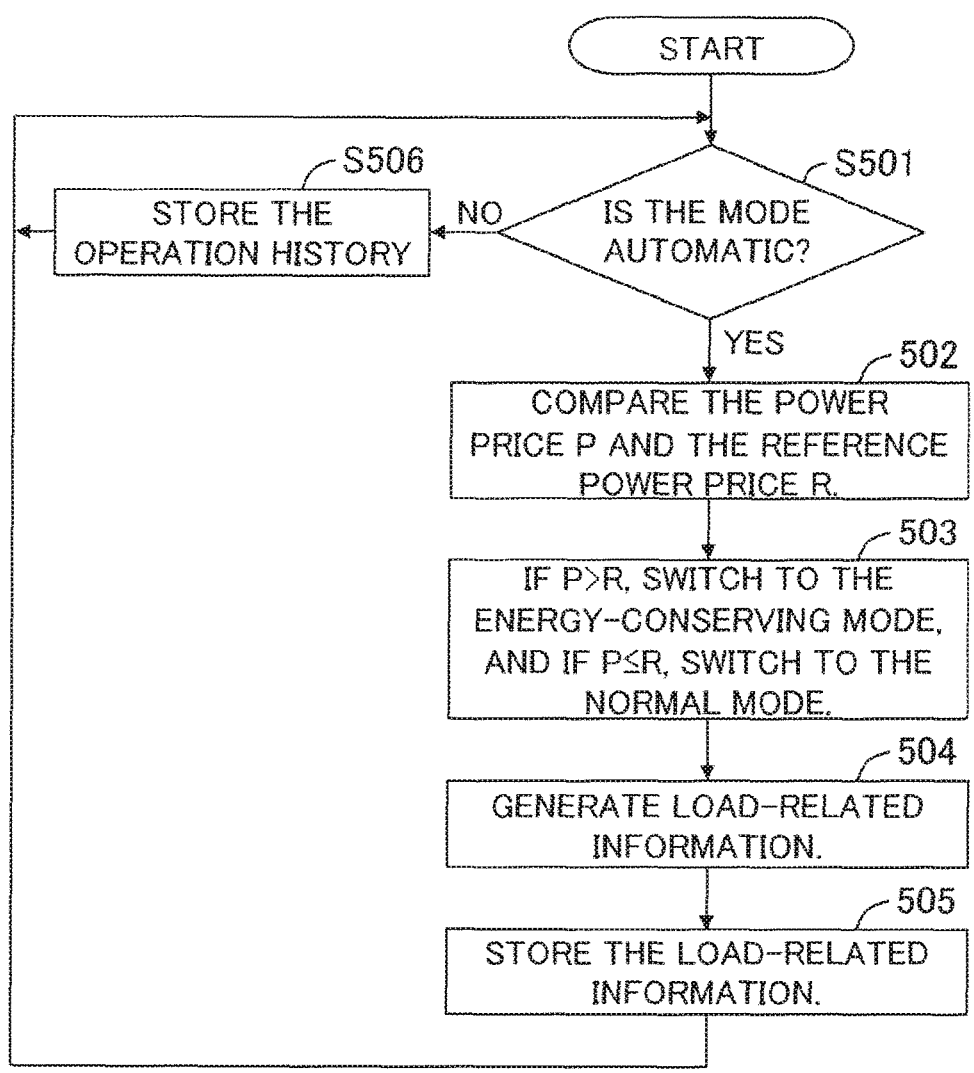
FIG. 5 is a flow chart for describing an example of an apparatus control algorithm for a refrigerator.

FIG. 5 is a flow chart to describe an example of the apparatus control algorithm for a refrigerator.

Control unit 2f determines whether the mode of control unit 2f is set to "automatic" (Step S501).

If the mode is set to "automatic" in Step S501, control unit 2f compares power price P at that time that is shown in the power price information with reference power price R (Step S502). The reference power price R is, for example, stored in advance in storage unit 2c. The reference power price R may show a price that is the same as reference power price Q shown in FIG. 2 or may show a price that is different.

If power price P is higher than reference power price R, control unit 2f next sets the mode of refrigerator 2a to the power-conserving mode. On the other hand, if power price P is equal to or lower than reference power price R, control unit 2f sets the mode of refrigerator 2a to the normal mode (Step S503). The power consumption during the power-conserving mode is less than the power consumption during normal mode.

Control unit 2f next generates load-related information that shows the relation of the identification information (refrigerator) of load 2a, power price P, and the power consumption of load 2a (Step S504).

Having generated the load-related information, control unit 2f stores this load-related information in storage unit 2c (Step S505).

FIG. 6 shows an example of the load-related information of a refrigerator that is stored in storage unit 2c.

In FIG. 6, the identification information, the power price P, and the power consumption are placed in association with the load-related information of the refrigerator.

The load-related information of the refrigerator shown in FIG. 6 indicates changes of power consumption of the refrigerator under the condition in which the mode of control unit 2f is set to "automatic." The load-related information of the refrigerator and the apparatus control algorithm for a refrigerator are used when aggregator system 61 estimates the power consumption of the refrigerator under the condition in which the mode of control unit 2f is set to "automatic." The load-related information of the refrigerator and the apparatus control algorithm for a refrigerator are examples of specific information.

When control unit 2f has generated load-related information, if there is load-related information (hereinbelow referred to as "third load-related information") in storage unit 2c in which, compared to this load-related information, the identification information and power price P are identical but power consumption is different, control unit 2f operates as described below.

Control unit 2f first uses the power consumption in the third load-related information and the power consumption in the load-related information that was generated in Step S504 to calculate a representative value of the power consumption. The method of calculating the representative value of power consumption is similar to the method of calculating the representative value of power consumption using power consumption in the first load-related information and the power consumption in the load-related information that was generated in Step S205. Control unit 2f next updates power consumption in the third load-related information to the representative value of power consumption.

When Step S505 has been completed, control unit 2f returns the process to Step S501.

On the other hand, when the mode is set to "manual" in Step S501, control unit 2f stores the operation history of the refrigerator in storage unit 2c (Step S506).

The identification information of load 2a, outside air temperature To, power price P, the time slot, power consumption, and the year and date are used as items of the operation history of a refrigerator.

FIG. 7 shows an example of the operation history of a refrigerator. In FIG. 7, the item of the year and date has been omitted in the interest of simplifying the explanation.

The operation history of the refrigerator shown in FIG. 7 shows the changes in power consumption of the refrigerator under the condition in which the mode of control unit 2f is set to "manual" The operation history of the refrigerator is used when aggregator system 61 estimates power consumption of the refrigerator under the condition in which the mode of control unit 2f is set to "manual." The operation history of the refrigerator is one example of the specific information.

When load 2a is a refrigerator, room temperature detection unit 2e may be omitted.

Control unit 2f periodically transmits the apparatus control algorithm, the load-related information, and the operation history in storage unit 2c together with the identification information of the consumer A facility from communication unit 2b to aggregator system 61. If the apparatus control algorithm has not been changed, control unit 2f need not re-transmit the apparatus control algorithm.

In aggregator system 61, when communication unit 6a receives the apparatus control algorithm, the load-related information, and the operation history together with the identification information of the consumer A facility, communication unit 6a supplies the apparatus control algorithm, the load-related information, and the operation history together with the identification information of the consumer A facility to control unit 6d. Control unit 6d, having received the apparatus control algorithm, the load-related information, and the operation history together with the identification information of the consumer A facility from communication unit 6a, stores the apparatus control algorithm, the load-related information, and the operation history in storage unit 6b for each item of identification information of consumer A facilities.

Each control unit 2f transmits from communication unit 2b to aggregator system 61 regarding the mode ("automatic" or "manual") of control unit 2f that is set at each time together with the identification information of the consumer A facility. In aggregator system 61, control unit 6d stores information regarding the mode of control unit 2f that is set at each time in storage unit 6b for each item of identification information of consumer A facilities, similar to the load-related information.

The operation of control unit 3e in consumer B facilities 31-3m is next described.

Control unit 3e measures the charge state of storage cell 3a by way of power conditioner 3b. In the present exemplary embodiment, control unit 3e measures the charge amount that is charged in storage cell 3a and the empty capacity of storage cell 3a.

In addition, control unit 3e stores the operation history of load 3f in storage unit 3d. In the present exemplary embodiment, the operation of load 3f is not controlled according to the power price. As a result, the identification information of load 3f, outside air temperature To, the time slot, power consumption and the year and date are used as items of the operation history of load 3f.

In addition, control unit 3e periodically transmits the operation history in storage unit 3d together with the identification information of the consumer B facility from communication unit 3c to aggregator system 61.

The operation of aggregator system 61 is next described.

Figure 8:
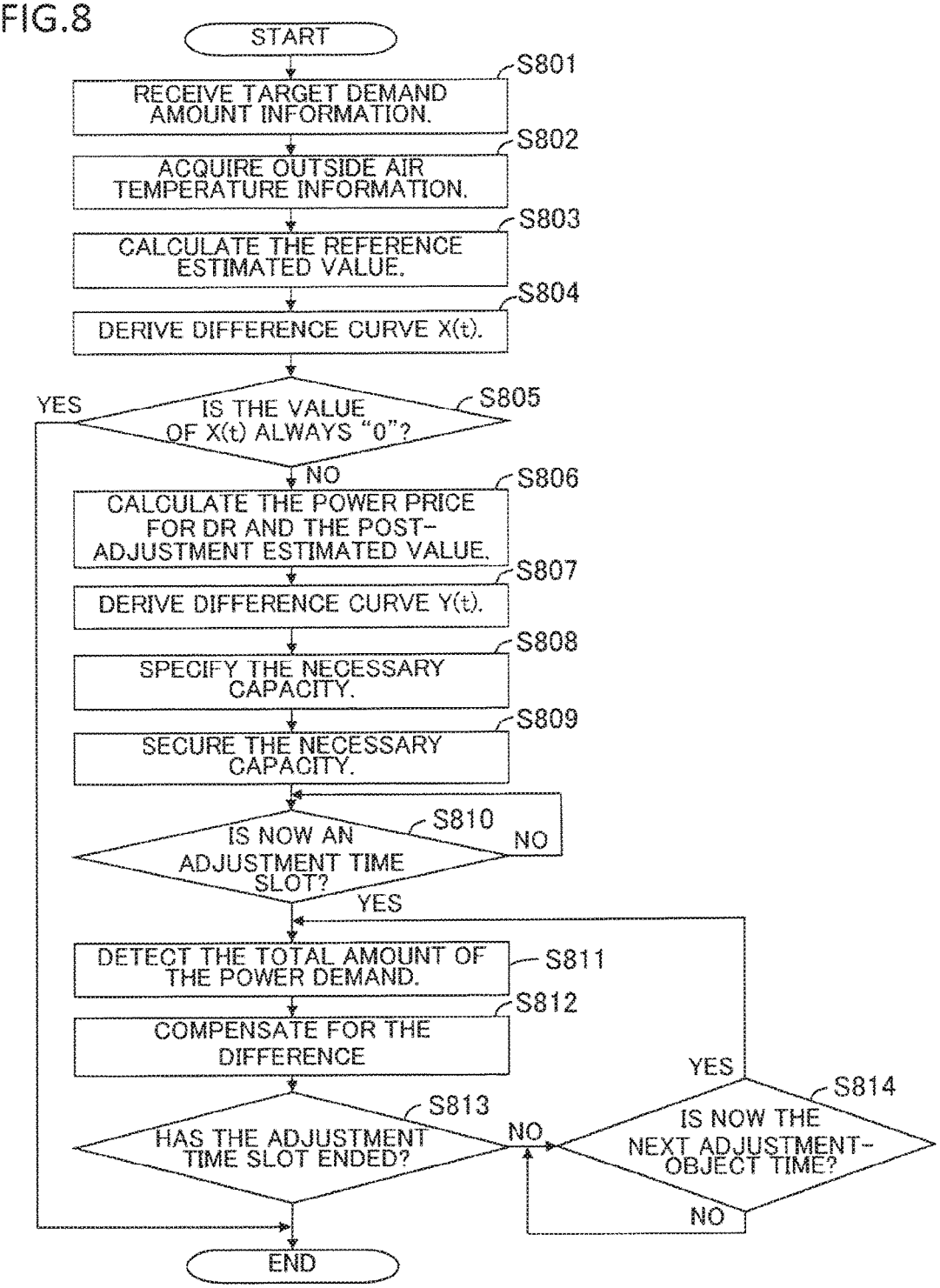
FIG. 8 is a flow chart for describing the operation of aggregator system 61.

FIG. 8 is a flow cha for describing the operation of aggregator system 61.

For example, it will be assumed that power company 4 determined at 18:00 that DR is to be activated because the average estimated temperature of a plurality of representative observation points of the managed area is predicted to surpass 35° C. from 13:00 to 15:00 of the following day.

Power company 4 requests the aggregator to implement DR such that the total amount of the power demand of each consumer that has concluded a DR contract (indirect DR contract or direct DR contract) in the interval from 13:00 to 15:00 of the following day does not surpass the target demand amount. This request may include, for example, a condition seeking that the total amount for each specific time interval (for example, 30 minutes) of the power demand of each consumer that has concluded a DR contract be accommodated within a range of error of ±3% taking as reference the total amount of the target demand amount of that specific time interval. The specific time interval is not limited to thirty minutes and can be altered as appropriate. The range of error is also not limited to ±3% and can be altered as appropriate.

As the target demand amount, a value is used that is a multiple of the sum total of the maximum used power contracted by each consumer A and each consumer B with power company 4. Y is, for example, 0.8. Y is determined according to the aggregator's ability to adjust the power demand.

At this time, target demand amount notification unit 41 transmits to aggregator system 61 target demand amount information that shows the target demand amount of each time in the interval of 13:00 to 15:00 of the following day. The interval of 13:00 to 15:00 of the following day is an example of an adjustment time slot.

In aggregator system 61, upon receiving target demand amount information, communication unit 6a supplies this target demand amount information to control unit 6d.

Upon receiving the target demand amount information (Step S801), control unit 6d acquires from weather information supply device 5 by way of communication unit 6a weather information such as "clear" or "cloudy" as well as outside weather information such as the temperature and the humidity (Step S802).

Control unit 6d next calculates an estimated value (hereinbelow referred to as the "reference estimated value") of the total amount of power demand for each adjustment-object time from 13:00 to 15:00 of the following day under the condition in which the standard power price has been set that was determined by power company 4 (Step S803).

In Step S803, control unit 6d operates, for example, as described below.

Control unit 6d first reads from storage unit 6b the apparatus control algorithm, the ode of control unit 2f that is set at each time of 13:00 to 15:00 of the following day, the load-related information, and the operation history for each consumer A facility.

Control unit 6d next uses the apparatus control algorithm, the mode of control unit 2f of each time of 13:00 to 15:00 of the following day, the outside air temperature information, and the standard power price to carry out a simulation of the operation of each load 2a for each adjustment-object time of 13:00 to 15:00 of the following day.

An example of the simulation is here described when load 2a is an air conditioner.

Control unit 2f executes a simulation such as described below for each adjustment-object time.

Control unit 6d first uses weather information to identify the outside air temperature of the adjustment-object time.

Control unit 6d next uses the load-related information of air conditioner 2a (refer to FIG. 3) to identify the outside air temperature (hereinbelow referred to as "corresponding outside air temperature") that indicates the same value as the outside air temperature of the adjustment-object time.

Control unit 6d next identifies the room temperature (hereinbelow referred to as "corresponding room temperature") that is placed in association with the corresponding outside air temperature in the load-related information of air conditioner 2a.

Control unit 6d then uses the mode of control unit 2f at the adjustment-object time, the corresponding room temperature, and the standard power price to virtually execute the apparatus control algorithm of air conditioner 2a to simulate the operation of air conditioner 2a.

When the result of the simulation of air conditioner 2a indicates that the air conditioner is OFF, control unit 6d determines that the estimated value of the power consumption of air conditioner 2a is "0."

If the mode of control unit 2f is "automatic" and if the result of the simulation of air conditioner 2a does not indicate that the air conditioner is OFF, on the basis of the load-related information of air conditioner 2a, control unit 6d identifies the power consumption that is placed in association with the corresponding outside air temperature and the standard power price as the estimated value of the power consumption of air conditioner 2a.

If the mode of control unit 2f is "manual," based on the operation history of air conditioner 2a (refer to FIG. 4), control unit 6d identifies the power consumption that is placed in association with the time slot that contains the adjustment-object time, the corresponding outside air temperature, and the standard power price as the estimated value of the power consumption of air conditioner 2a.

Control unit 6d executes simulations for loads 2a other than an air conditioner in accordance with the simulation for an air conditioner.

In addition, control unit 6d, based on the operation history of load 3f, identifies the power consumption that is placed in association with the time slot that contains the adjustment-object time and the corresponding outside air temperature as the estimated value of the power consumption of load 3f.

Control unit 6d next calculates the reference estimated value that is the sum total of the estimated values of power consumption of each of loads 2a and 3f for each adjustment-object time. When calculating the reference estimated value, control unit 6d assumes that each storage cell 3a has halted operation.

Upon completing Step S803, control unit 6d calculates for each adjustment-object time the difference between the reference estimated value and the tar demand amount with each subtraction of the target demand amount from the reference estimated value. Control unit 6d then derives a difference curve X(t) that takes the adjustment-object time as an independent variable and that takes the difference between the target demand amount and the reference estimated amount as a dependent variable (Step S804).

Figure 9:
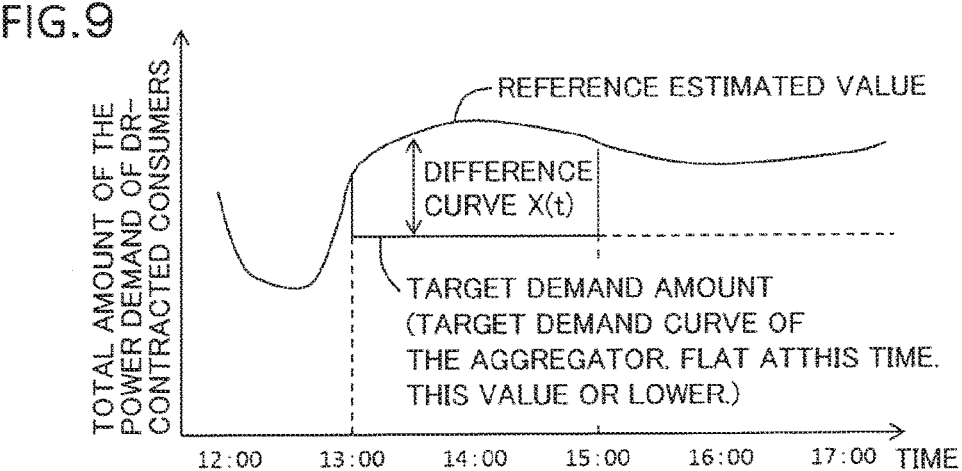
FIG. 9 shows the relation between a target demand amount, a reference estimated value, and a difference curve X(t).

FIG. 9 shows the relation between the target demand amount, the reference estimated value, and the difference curve X(t).

Control unit 6d next determines whether the value of difference curve X(t) is always "0" (Step S805).

If the value of difference curve X(t) is not always "0," control unit 6d calculates the power price that can reduce the power demand amount indicated by difference curve X(t) (hereinbelow referred to as "power price for DR") and the estimated value of the total amount of power demand of each adjustment-object time of 13:00 to 15:00 of the following day under the condition in which the power price for DR has been set (hereinbelow referred to as the "post-adjustment estimated value") (Step S806).

In Step S806, control unit 6d operates as described hereinbelow.

Control unit 6d first generates a plurality of candidates of the power price for DR.

Control unit 6d next calculates a "candidate of the post-adjustment estimated value" that is the sum total of the estimated values of the power consumption of each load 2a for each adjustment-object time for each of the candidates of power price for DR. As the process for calculating the "post adjustment estimated value candidates," control unit 6d uses, for example, a process of substituting the "standard power price" for the "candidate of power price for DR" in the process of Step S803.

Control unit 6d next, by subtracting the target demand amount from the candidates of the post-adjustment estimated value for each adjustment-object time in units of candidates for the power price for DR, calculates the difference between the candidate for the post-adjustment estimated value and the target demand amount (hereinbelow referred to as the "adjustment difference").

Control unit 6d then, for each candidate for the power price for DR, by adding the adjustment difference of each adjustment-object time, calculates the sum total of the adjustment differences (hereinbelow referred to as the "adjustment difference sum total").

Control unit 6d then, from among the plurality of candidates for power price for DR, identifies as the power price for DR the candidate for power price for DR in which the absolute value of the adjustment difference sum total is a minimum.

Control unit 6d then identifies the post-adjustment estimated value candidate" of each adjustment-object time for the power price for DR as the "post-adjustment estimated value" of each adjustment-object time.

Upon the completion of Step S806, control unit 6d calculates the difference between the post-adjustment estimated value and the target demand amount (hereinbelow referred to as the "post-adjustment difference" by subtracting the target demand amount from the post-adjustment estimated value for each adjustment-object time. Control unit 6d next derives difference curve Y(t) that takes the adjustment-object time as an independent variable and the post-adjustment difference as a dependent variable (Step S807).

Figure 10:
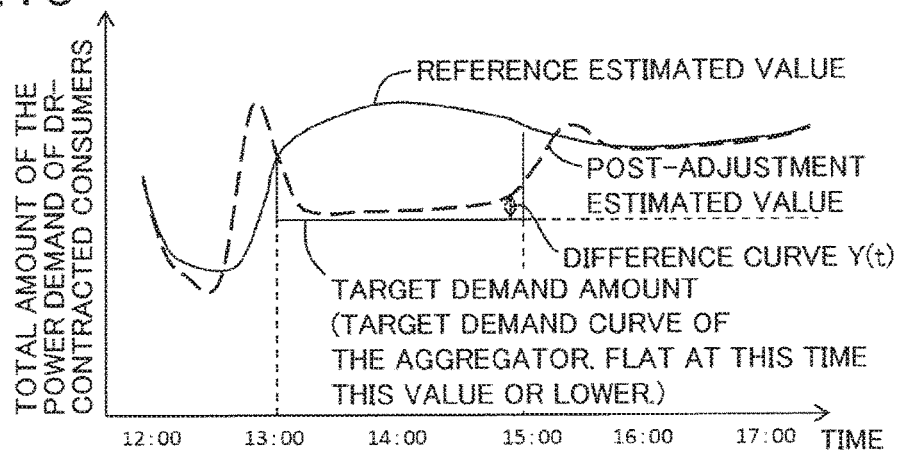
FIG. 10 shows the relation between a target demand amount, a reference estimated value, a post-regulation estimated value, and a difference curve Y(t).

FIG. 10 shows the relation among the target demand amount, the reference estimated value, the post-adjustment estimated value, and the difference curve Y(t).

Figure 11:
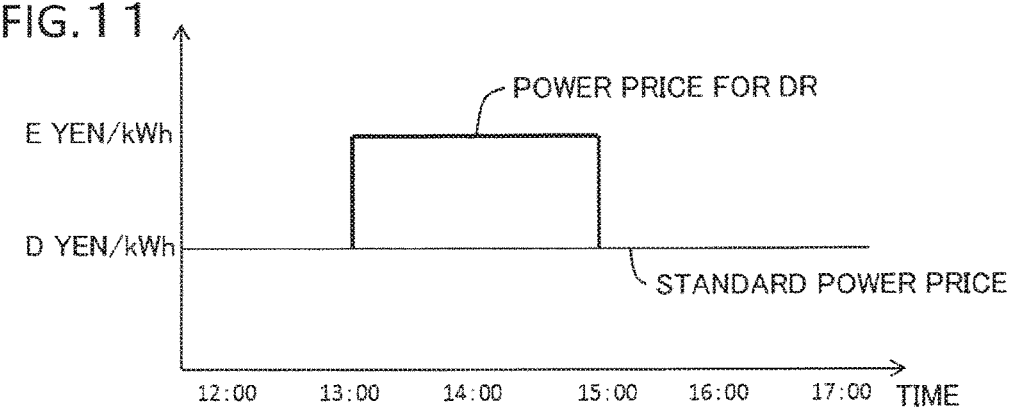
FIG. 11 shows an example of power price for DR.

FIG. 11 shows an example of the power price for DR.

Control unit 6d next, based on the sum total of the post-adjustment differences of the power price for DR, identifies the overall capacity of storage cell 3a that is required to make the value indicated by the difference curve Y(t) "0" (hereinbelow referred to as "the necessary capacity") (Step S808).

In the present exemplary embodiment, control unit 6d multiplies the sum total of the post-adjustment differences of the power price for DR by an adjustment coefficient α and identifies the result of multiplication as the necessary capacity. As an example, the adjustment coefficient α is "1.5". The adjustment coefficient α is not limited to "1.5" and can be altered as appropriate. The adjustment coefficient α has the function of adjusting the degree of margin of the necessary capacity. As a result, the adjustment coefficient α is preferably set according to the actual performance of adjustment of the power demand amount in the past.

Control unit 6d next judges whether the preset operation conditions have been satisfied.

As the operation conditions, for example, a first operation condition is used in which the overall amount of power that can be charged in each of storage cells 3a is equal to or greater than the necessary capacity, and moreover, in which the sum total of the rated output of each power conditioner 3b is equal to or greater than the maximum value of the absolute value of the value of the difference curve Y(t). The overall chargeable capacity of each storage cell 3a is stored in advance in storage unit 6b.

When the operation conditions have been satisfied, control unit 6d judges that the total amount of the power demand in an adjustment time slot can be adjusted to the target demand amount.

Upon judging that the total amount of the power demand in an adjustment time slot can be adjusted to the target demand amount, control unit 6d uses communication unit 6a to notify target demand amount notification unit 41 that the sum total of power demand amount in the adjustment time slot is to be adjusted to the target demand amount. This notification means that aggregator system 61 has concluded a contract (hereinbelow referred to as a "DR implementation contract") with power company 4 to adjust the total amount of the power demand to the target demand amount in the adjustment time slot On the other hand, when the operation condition has not been satisfied, control unit 6d uses communication unit 6a to notify target demand amount notification unit 41 that adjustment of the total amount of the power demand will not be implemented in the adjustment time slot and thereafter ends operation. Alternatively, control unit 6d may also alter the target demand amount that was reported from power company 4 to the target demand amount that aggregator system 61 is capable of adjusting and then report the contract at the target demand amount that follows the change to power company 4 (for example, target demand amount notification unit 41). When this report has been acknowledged by power company 4, control unit 6d may then conclude the contract at the target demand amount that follows the change with power company 4 (for example, target demand amount notification unit 41). In this case, power company 4 (for example, target demand amount notification unit 41) subtracts the amount of power of aggregator system 61 from the total target demand amount (the sum of the power that was borne by the power demand adjustment of aggregator systems 61-6s) and assigns the remainder to other aggregator systems. In this case, power company 4 (for example, target demand amount notification unit 41) selects the aggregator systems that are to carry out the re-adjustment of this power demand while giving priority to the aggregator system that has made a contract for the readjustment of this power demand at the lowest incentive.

When target demand amount notification unit 41 is notified by control unit 6c that the adjustment of the total amount of the power demand in an adjustment time slot is to be carried out, control unit 6c adjusts the charging amount of storage cell 3a according to the post-adjustment difference to secure the necessary capacity (Step S809).

Relating to Step S809, explanation is presented for a case in which the necessary capacity is a positive value and a case in which the necessary capacity is a negative value.

When the necessary capacity is a positive value, the power charged to storage cell 3a is used for compensating for the post-adjustment difference. As a result, control unit 6d controls each storage cell 3a such that the sum total of the amount of power that is charged to each storage cell 3a is equal to or greater than the necessary capacity.

For example, control unit 6d uses operation instructions for each storage cell 3a to adjust the amount of power that is charged to storage cell 3a to be equal to or more than power amount $\int Pm(t)dt = \int((Y(t)/\Sigma Pm)\times Pm)dt$. Here, Pm is the rated output of power conditioner 3b that is connected to storage cell 3a. $\Sigma Pm$ is the integrated value of the rated output Pm of each power conditioner 3b. The range of the integral is the adjustment time slot. The rated output Pm of each power conditioner 3b may be equal or may mutually differ.

On the other hand, when the necessary capacity is a negative value, the empty capacity (the remaining capacity that can be charged) of storage cell 3a is used for compensating for the post-adjustment difference. As a result, control unit 6d controls each storage cell 3a such that the sum total of the empty capacity of each storage cell 3a is equal to or greater than the absolute value of the necessary capacity.

For example, for each storage cell 3a, control unit 6d uses operation instructions to adjust the empty capacity of storage cells 3a to be equal to or greater than the absolute value of power amount $\int Pm(t)dt = \int((Y(t)/\Sigma Pm)\times Pm)dt$.

Subsequently, when it is 13:00 of the following day (Step S810), control unit 6d uses communication unit 6a to transmit operation instructions instructing the halt of charging and discharging to each of consumer B facilities 31-3m and supplies to power demand amount detection unit 6c a detection start instruction indicating an instruction to begin detection.

Upon receiving the detection start instruction, power demand amount detection unit 6c uses communication unit 6a to acquire the actual amount of power consumption of loads 2a from control units 2f in consumer A facilities 21-2n, and moreover, the actual amount of power consumption of loads 3f from control units 3e in consumer B facilities 31-3m. Power demand amount detection unit 6c then detects the sum total of the actual power consumption of each load 2a and each load 3f as the total amount of the power demand (Step S811). Power demand amount detection unit 6c next reports the total amount of the power demand to control unit 6d.

Upon receiving notification of the total amount of the power demand, control unit 6d updates the post-adjustment estimated value of that adjustment-object time to the total amount of the power demand that was reported.

Control unit 6d next derives a difference curve Ya(t) that takes the adjustment-object time as an independent variable and the difference between the post-adjustment estimated value and the target demand amount as a dependent variable.

Control unit 6d then reads rated output Pm of each power conditioner 3b from storage unit 6b.

Next, control unit 6d calculates the integrated value $\Sigma Pm$ of the rated output Pm of each power conditioner 3b.

Control unit 6d then prescribes $Pm(t)=(Ya(t)/\Sigma Pm)\times Pm$ as the output Pm(t) of storage cell 3a for each storage cell 3a when the time quadrature value $\int Ya(t)dt$ at the adjustment time slot (13:00-15:00) of difference curve Ya(t) is made $\int Ya(t)dt=Ytotal$.

This process uses the fact that $\Sigma[\int Pm(t)dt]$ is equal to Ytotal.

Control unit 6d then uses communication unit 6a to transmit to consumer B facilities 31-3m an operation instruction indicating $(Ya(t)/\Sigma Pm)$ to compensate for the difference between the post-adjustment estimated value that follows updating and the target demand amount (Step S812).

In each of consumer B facilities 31-3m, upon receiving the operation instruction that indicates $(Ya(t)/\Sigma Pm)$, communication unit 3c supplies this operation instruction to control unit 3e. Control unit 3e, upon receiving the operation instruction indicating $(Ya(t)/\Sigma Pm)$, activates power conditioner 3b in accordance with the calculation result of Pm(t) of multiplying $(Ya(t)/\Sigma Pm)$ by the rated output of power conditioner 3b to adjust the output of storage cell 3a. Control unit 3e executes discharging of Pm(t) from storage cell 3a when power amount Pm(t) is a positive value. Alternatively, control unit 3e executes charging of Pm(t) to storage cell 3a when power amount Pm(t) is a negative amount.

Control unit 6d subsequently determines whether the adjustment time slot (13:00-15:00) has ended (Step S813).

If the adjustment time slot (13:00-15:00) has not ended, control unit 6d waits until the next adjustment-object time (Step S814) and returns the process to Step S811 at the next adjustment-object time. On the other hand, if the adjustment time slot (13:00-15:00) has ended, control unit 6d ends the operation.

Subsequently, each consumer B is paid incentive fees according to the integrated power amount $\int Pm(t)dt$ of storage cell 3a belonging to that consumer B.

The effect of the present exemplary embodiment is next described.

In the present exemplary embodiment, power demand amount detection unit 6c acquires information indicating the power demand amount on the consumer side that changes according to power price information that prompts adjustment of the power demand. Control unit 6d uses storage cell 3a to compensate for the difference between the total amount of the power demand and the target demand amount.

Further, in the present exemplary embodiment, power demand amount detection unit 6c acquires information indicating the power demand amount on the consumer side after power price information that prompts adjustment of power demand has been transmitted from the transmission source of the power price information. Control unit 6d uses storage cell 3a to compensate for the difference between total amount of the power demand and the target demand amount.

As a result, the difference between the power demand amount and the target demand amount that occurs when power adjustment is implemented according to power price information can be compensated for charging operations or discharging operations of storage cells 3a. As a result, the difference between the power demand amount and the target demand amount can be decreased while carrying out power adjustment that accords with power price information. Accordingly, the adjustment of the power demand amount that causes the actual power demand amount to approach the target power demand amount can be carried out at high accuracy.

The above-described effects are also exhibited by an aggregator system that is made up of power demand amount detection unit 6c and control unit 6d.

Figure 12:
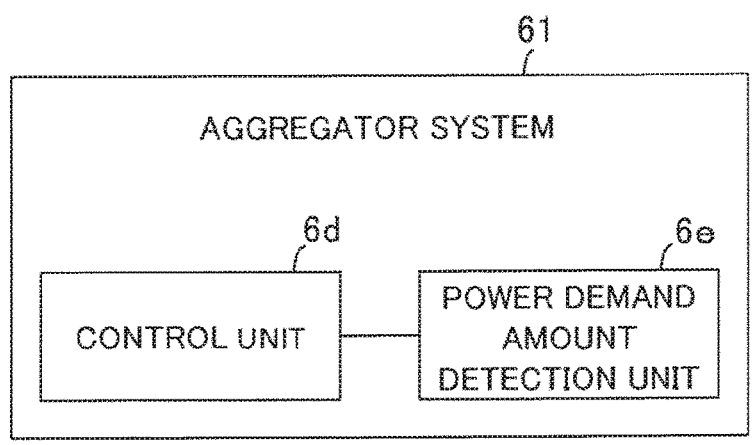
FIG. 12 shows an aggregator system composed of power demand amount detection unit 6c2 and control unit 6d.

FIG. 12 shows an aggregator system that is made up of power demand amount detection unit 6c and control unit 6d.

In the present exemplary embodiment, control unit 6d transmits power price information that is generated based on the target demand amount to control units 2f that control the operation of loads 2a.

As a result, control unit 6d is able to control the operation of storage cells 3a to compensate for the difference between the adjustment result and the target demand amount while using the power price information to adjust the power demand in loads 2a.

In addition, by using control units 2f that control the operation of loads 2a according to the power price information, the accuracy of the control of power demand that uses power price information can be made higher than a case in which a person controls apparatuses according to power price information.

When a multitude of loads 2a and control units 2f are used, it must be considered that the multitude of loads 2a will all operate simultaneously according to power price information. In this case, there is a high probability that an undesirable peak will occur in the power demand based on the operation of loads 2a. In the present exemplary embodiment, the operation of storage cells 3a is controlled in order to mitigate this undesirable peak in power demand. As a result, adjustment of the power demand amount can be implemented with high accuracy while DR is carried out with high reliability.

In the present exemplary embodiment, power price information that prompts the adjustment of power demand is information that prompts adjustment of the power demand in adjustment time slots. Power demand amount detection unit 6c detects the power demand amount at each adjustment-object time within an adjustment time slot. Control unit 6d controls the operation of storage cells 3a to compensate for the difference between the power demand amount and the target demand amount for each adjustment-object time.

As a result, when time slots in which the balance of supply and demand of electric power is predicted to be difficult are used as adjustment time slots and the power demand amount that is required to achieve balance between supply and demand of electric power is used as the target demand amount, the balance between the supply and demand of electric power can be achieved in these time slots.

In the present exemplary embodiment, control unit 6d estimates the power demand amount in an adjustment time slot on the basis of power price information at a time that precedes the adjustment time slot.

As a result, the power demand amount in the adjustment time slot can be estimated before the adjustment time slot.

In the present exemplary embodiment, control unit 6d adjusts the charging amount of storage cells 3a according to the difference between the result of estimation and the target demand amount.

As a result, storage cells 3a having the required charging amount or empty capacity to compensate for the difference between the power demand amount and the target demand amount can be secured. The difference between the power demand amount and the target demand amount can therefore be compensated for with high probability.

In the present exemplary embodiment, control unit 6d automatically controls loads 2a of consumers A based on power price information.

As a result, control unit 6d is able to use power price information to automatically adjust the power demand in loads 2a.

In the present exemplary embodiment, storage cells 3a are customer-side apparatuses.

As a result, the difference between the power demand amount and the target demand amount that occurs when power adjustment is carried out in accordance with power price information can be compensated for by using customer-side apparatuses.

In the present exemplary embodiment, control unit 6d controls the operation of storage cell 3a of consumers B to compensate for the difference between the total amount of the power demand and the target demand amount.

As a result, the difference between the total amount of the power demand and the target demand amount can be compensated for without controlling the apparatuses of consumers A.

In the present exemplary embodiment, control unit 6d determines the necessary capacity of storage cells 3a to compensate for the difference between the total amount of the power demand and the target demand amount by subtracting the target demand amount from the total amount of the anticipated power demand. Control unit 6d compensates for the difference between the total amount of the power demand and the target demand amount by discharging storage cells 3a when the necessary capacity is a positive value. Control unit 6d compensates for the difference between the total amount of the power demand and the target demand amount by charging storage cells 3a when the necessary capacity is a negative value.

As a result, charging/discharging of storage cells 3a can be appropriately controlled to compensate for the difference between the total amount of the power demand and the target demand amount.

In the present exemplary embodiment, control unit 6d halts the operation of storage cells 3a when determining the total amount of power consumed by consumers A and consumers B.

As a result, the total amount of power consumed by consumers A and consumers B can be determined with high precision.

As a modification, control unit 6d may set the power price in an adjustment time slot to a fixed value as shown in FIG. 11 or may set the power price to vary within the adjustment time slot.

For example, control unit 6d may make the power price that is indicated by the power price information a price that accords with real-time pricing. In real-time pricing, the power price varies in real time according to the amount of generated power by photovoltaic generation devices and wind power generation devices. As a result, in real-time pricing, the power price will vary by day even within the same time slot. In real-time pricing, the power price is determined according to a real-time price pattern that shows the relation between the amount of power generation and the power price. Control unit 6d may use the real-time price pattern to find the estimated value of the power demand amount in an adjustment time slot.

In addition, control unit 6d may also adjust the power price in addition to controlling storage cells 3a to compensate for the difference between the power demand amount and the target demand amount in an adjustment time slot.

As an example of the implementation of DR in the present exemplary embodiment, implementation of DR was used in which the total amount of the power demand of each consumer that has concluded a DR contract was kept from exceeding the target demand amount, but examples of the implementation of DR are not limited to this form.

Figure 13:
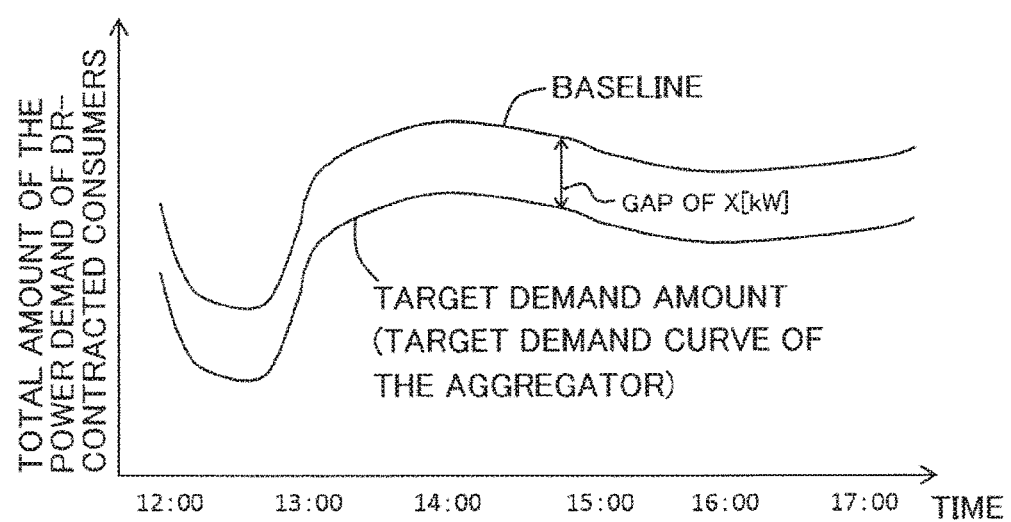
FIG. 13 shows another example of the target demand amount.

As another example of the DR implementation, implementation of DR can be offered in which a fixed value X[kW](for example, 200 MW) is cut from a power demand baseline of an aggregator during a particular time interval (for example, 13:00 to 15:00 of the following day), as shown in FIG. 13.

The power demand baseline of an aggregator in the time interval 13:00 to 15:00 takes as an object the total amount of power demand of all consumers with whom the aggregator has concluded a DR contract. There are various setting methods regarding the power demand baseline at 13:00-15:00. For example, the following examples (1)-(3) can be offered.

(1) A power demand curve at 13:00 to 15:00 of the preceding day of DR implementation is set as the power demand baseline.

(2) An average power demand curve of a plurality of days in which the air temperature was the same as the estimated air temperature of 13:00-15:00 on a day in which DR was implementation, and moreover, on a day in which DR was not implemented, is set as the power demand baseline.

(3) The average of a power demand curve at 13:00-15:00 on the same days of weekdays of the past month in which DR was implemented, is set as the power demand baseline.

In this case, the power demand curve of "power demand baseline-X[kW]" is the demand curve that is taken as the target of the aggregator.

Modifications are next described.

Instead of aggregator system 61 transmitting power price information, an apparatus (not shown) on the power company 4 side may transmit the power price information.

Alternatively, power company 4 itself my also serve as an aggregator.

In addition, in aggregator system 61, control unit 6d may also control the operation of each storage cell 3a to compensate for the difference between the power demand amount and the target demand amount at an adjustment time slot without estimating the power demand amount in the adjustment time slot.

Still further, in a consumer A facility, a consumer A (a person) may use a display unit (not shown) to recognize power price information that has been received by communication unit 2b and then control the operation of load 2a without control unit 2f automatically controlling the operation of load 2a according to power price information. In this case, control unit 2f constantly stores the operation history of load 2a. Control unit 6d then uses the operation history of load 2a to estimate the power demand amount in an adjustment time slot.

Alternatively, control unit 6d may acquire in advance a response schedule of load 2a that accords with the power price and then predict the power demand amount in an adjustment time slot based on this response schedule.

Control unit 6d may also stochastically comprehend by, for example, machine learning, the scheduled behavior of a consumer in an adjustment time slot (for example, whether the consumer is present in a room in which an air conditioner is installed in an adjustment time slot), and then, considering the comprehension result, predict the power demand amount in an adjustment time slot.

In the present exemplary embodiment described hereinabove, an apparatus (storage cell) in a consumer B facility may be used as a specific apparatus, but another apparatus (for example, a storage cell) in a consumer A facility may be used as a specific apparatus.

A consumer A facility or a consumer B facility may be the facility in which an apparatus, in which operation is automatically controlled according to power price information, is installed. The consumer A facility or consumer B facility is, for example, a residence, multiple-family dwelling, condominium, building, store, factory, service station, or base station in which load 2a and control unit 2f are installed.

In a consumer B facility, load 3f and outside air temperature detection unit 3g may be omitted, in addition, load 2a may be used as load 3f. When load 2a is used as load 3f, control unit 3e is provided with the capabilities of control unit 2f.

In addition, when the predetermined information that prompts adjustment of power demand is demand information, power conserving request information, power consumption suppression rate, or the amount of power that must be reduced may be used as the demand information apart from power price information.

Aggregator system 61 may be realized by a computer. In this case, the computer reads and executes a program that is recorded on a recording medium such as a CD-ROM (Compact Disk Read Only Memory) that can be read by a computer to realize each of the functions belonging to aggregator system 61. The recording medium is not limited to a CD-ROM and can be modified as appropriate.

In addition, aggregator system 61 may be made up of a single information-processing device, or may be made up of a plurality of processing devices.

In the exemplary embodiment described hereinabove, the configuration shown in the drawings is only an example, and the present invention is not limited to this configuration.

Although the invention of the present application has been described with reference to the exemplary embodiments, the invention of the present application is not limited to the exemplary embodiments described hereinabove and is open to various modifications within the scope of the invention of the present application that will be clear to one of ordinary skill in the art. This application claims the benefits of priority based on Japanese Patent Application No. 2013-226251 for which application was submitted on Oct. 31, 2013 and incorporates by citation all of the disclosures of that application.

REFERENCE SIGNS LIST 1000 power system
1 power grid
21-2n consumer A facilities
2a load
2b communication unit
2c storage unit
2d outside air temperature detection unit
2e room temperature detection unit
2f control unit
31-3m consumer B facilities
3a storage cell
3b power conditioner
3c communication unit
3d storage unit
3e control unit
3f load
3g outside air temperature detection unit
4 power company
41 target demand amount notification unit
5 weather information supply device
6 aggregator system
6a communication unit
6b storage unit
6c power demand amount detection unit
6d power demand amount detection unit
6e control unit

The invention claimed is:

1. A power control system comprising:
a memory storing instructions; and
a processor configured to execute the instructions to:
generate predetermined information that prompts adjustment of power demand within a predetermined time slot, based on a target demand amount;
transmit the predetermined information to an apparatus controller that controls operation of specific apparatuses of consumers according to the predetermined information;
acquire information indicating an amount of power demand that is used by consumers in accordance with the predetermined information; and
use predetermined apparatuses, which are apparatuses different from the specific apparatuses, to compensate for the difference between a total amount of the power demand and the target demand amount.

2. The power control system as set forth in claim 1, wherein the processor is further configured to execute the instructions to:
use specific information that identifies an amount of power demand that is used by consumers according to the predetermined information in the predetermined time slot to predict at least the amount of the power demand or a total amount of the power demand at a time before the predetermined time slot.

3. The power control system as set forth in claim 2, wherein the processor is further configured to execute the instructions to:
detect the power demand amount at each predetermined time within the predetermined time slot; and
control operation of the predetermined apparatuses that influence power demand to compensate for the difference between the total amount of the power demand and the target demand amount.

4. The power control system as set forth in claim 1, wherein the apparatus controller: automatically or manually controls the specific apparatuses of the consumers on the basis of the predetermined information.

5. The power control system as set forth in claim 1, wherein the predetermined apparatuses are apparatuses on the consumer side.

6. The power control system as set forth in claim 1, wherein:
the predetermined apparatuses are storage cells;
and the processor is further configured to execute the instructions to:

control operation of the storage cells according to information indicating the power demand amount and the target demand amount.

7. The power control system as set forth in claim 6, wherein the processor is further configured to execute the instructions to:
adjust charging amount of the storage cells according to the difference between the total amount of the power demand that was predicted and the said target demand amount.

8. The power control system as set forth in claim 6, wherein:
the predetermined apparatuses are storage cells; and
the processor is further configured to execute the instructions to:
determine a necessary capacity of storage cells according to the power demand amount and the target demand amount, and
control discharging or charging of the storage cells according to the necessary capacity.

9. The power control system as set forth in claim 6, wherein:
the consumers have specific apparatuses, and the apparatus controller automatically controls operation of the specific apparatuses;
the predetermined information includes power price information; and the processor is further configured to execute the instructions to:
predict, when the apparatus controller automatically controls the operation of the specific apparatuses according to the power price information, power consumption of the specific apparatuses on the basis of weather information and a standard power price.

10. The power control system as set forth in claim 6, wherein:
the consumers have specific apparatuses and the apparatus controller manually controls operation of the specific apparatuses;
the predetermined information is power price information; and the processor is further configured to execute the instructions to:
predict, when the apparatus controller manually controls the operation of the specific apparatuses, power consumption of the specific apparatuses on the basis of operation history of the specific apparatuses, weather information, and a standard power price.

11. The power control system as set forth in claim 1, wherein:
the information that prompts adjustment of the power demand is power price information;
the predetermined apparatuses are storage cells; and the processor is further configured to execute the instructions to:
adjust, in addition to controlling the storage cells in accordance with the power demand amount and the target demand amount, the power price information.

12. The power control system as set forth in claim 6, wherein the processor is further configured to execute the instructions to:
halt, when determining total amount of power consumption that is used by consumers, operation of the storage cells.

13. The power control system as set forth in claim 1, wherein the predetermined information is demand information, power conserving request information, power consumption suppression rate, or an amount of power that must be reduced.

14. A power control method, the method comprising:
generating predetermined information that prompts adjustment of power demand within a predetermined time slot, based on a target demand amount;
transmitting the predetermined information to an apparatus controller that controls operation of specific apparatuses of consumers according to the predetermined information;
acquiring information indicating an amount of power demand that is used by consumers in accordance with the predetermined information; and
using predetermined apparatuses, which are apparatuses different from the specific apparatuses, to compensate for the difference between a total amount of the power demand and the target demand amount.

15. A non-transitory computer readable medium having instructions stored thereon that, when executed by at least one processor, instruct the at least one processor to perform a method comprising:
generating predetermined information that prompts adjustment of power demand within a predetermined time slot, based on a target demand amount;
transmitting the predetermined information to an apparatus controller that controls operation of specific apparatuses of consumers according to the predetermined information;
acquiring information indicating an amount of power demand that is used by consumers in accordance with the predetermined information; and
using predetermined apparatuses, which are apparatuses different from the specific apparatuses, to compensate for the difference between a total amount of the power demand and the target demand amount.

\* \* \* \* \*